US007724979B2

(12) United States Patent
Drezner et al.

(10) Patent No.: US 7,724,979 B2
(45) Date of Patent: May 25, 2010

(54) VIDEO PREPROCESSING TEMPORAL AND SPATIAL FILTER

(75) Inventors: David Drezner, Raanana (IL); Gideon Kojokaro, Ramat Hasharon (IL)

(73) Assignee: Broadcom Corporation, Irvine, CA (US)

( * ) Notice: Subject to any disclaimer, the term of this patent is extended or adjusted under 35 U.S.C. 154(b) by 1483 days.

(21) Appl. No.: 10/978,819

(22) Filed: Nov. 2, 2004

(65) Prior Publication Data

US 2006/0093236 A1 May 4, 2006

(51) Int. Cl.
G06K 9/40 (2006.01)
(52) U.S. Cl. .................. 382/261; 382/260; 382/264; 382/254; 348/226.1; 348/241
(58) Field of Classification Search ............ 382/272, 382/275, 254, 260–265; 348/226.1–228.1, 348/241
See application file for complete search history.

(56) References Cited

U.S. PATENT DOCUMENTS

| 4,750,367 | A | * | 6/1988 | Bernatets ................... 73/602 |
| 5,329,317 | A | * | 7/1994 | Naimpally et al. .......... 348/620 |
| 6,064,776 | A | * | 5/2000 | Kikuchi et al. ............. 382/260 |
| 6,137,917 | A | * | 10/2000 | Park ........................... 382/262 |
| 6,526,173 | B1 | * | 2/2003 | Burns ......................... 382/236 |
| 6,681,054 | B1 | * | 1/2004 | Gindele ...................... 382/272 |
| 6,804,408 | B1 | * | 10/2004 | Gallagher et al. ........... 382/272 |
| 6,865,291 | B1 | * | 3/2005 | Zador ......................... 382/166 |
| 6,879,732 | B1 | * | 4/2005 | Sokolov ...................... 382/275 |
| 7,280,161 | B2 | * | 10/2007 | Satou et al. ................. 348/701 |
| 7,386,747 | B2 | * | 6/2008 | Dockser ..................... 713/324 |
| 2006/0093236 | A1 | * | 5/2006 | Drezner et al. .............. 382/272 |
| 2006/0259791 | A1 | * | 11/2006 | Dockser ..................... 713/300 |
| 2009/0202164 | A1 | * | 8/2009 | Rossato et al. .............. 382/238 |

* cited by examiner

*Primary Examiner*—Aaron W Carter
*Assistant Examiner*—Sean Motsinger
(74) *Attorney, Agent, or Firm*—Sterne, Kessler, Goldstein & Fox P.L.L.C.

(57) ABSTRACT

The invention refers to an apparatus and a method for reducing random noise in a sequence of digital video frames comprising the following steps:
1. for each of the pixels (center pixel) in a frame a set of adjacent pixels is defined;
2. for each of the adjacent pixels the difference of their values in the current frame and the previous frame is calculated, whereby the value of the center pixel is omitted;
3. each difference value is shifted right for a predefined number of bits;
4. the square of the difference value is added to an activity value of that center pixel;
5. if the activity value remains below a predefined threshold value, then a weighting factor depending from activity value is calculated and
6. the value of the center pixel is set to a weighted value.

13 Claims, 3 Drawing Sheets

VIDEO PREPROCESSING TEMPORAL AND SPATIAL FILTER

BACKGROUND OF THE INVENTION

The invention relates to reducing noise in a sequence of video frames and more particularly relates to such techniques by using impulse reducing techniques.

One application of the invention is to remove noise from a sequence of video frames which have been digitized from the analog domain. The benefit of removing noise is that the efficiency of a digital compression system is increased, thus resulting in better perceptual quality. Digital compression systems generally make use of redundant information in a sequence of video frames in order to reduce the amount of data necessary to restore the frames of the video sequence. The removal of this redundant information and subsequent encoding of the sequence of frames produces a compressed bit stream representing the original video sequence. The quality of the restoration of the decompressed bit stream into the original sequence of video frames depends on the efficiency with which the compression system encodes the information, and on the ratio between the amount of original video data and the compressed bit stream data. So, if a sequence of video frames is given, the higher the compression ratio is the smaller is the produced bit stream. As the compression ratio increases a point is reached in which non-redundant information is lost or degraded in the compression process, so that perceivable and therefore objectionable artifacts are produced.

In digital images fine details are represented as high frequency two-dimensional information, whereas coarse details are represented by low frequency two-dimensional information that may even include DC frequency, i.e. zero frequency.

Image or video compression systems require more bits to encode fine image details than coarse details, so fine details produce larger bit streams.

Some fine image details are caused by non-redundant information, but there are also fine details caused by random noise in the original input sequence of frames, which can be introduced in the analog domain as well as in the digital domain. For example in the analog domain noise can be caused by recording and playback of the sequence from a video tape, by errors introduced in transmission or by interference created by external signal sources. In the digital domain, random noise can be created in the analog-to-digital conversion process or by thermal noise in electronic components, electronic interference and the like.

The invention described in this specification relates to two types of noise, namely temporal noise and salt-and-pepper noise. Both types can be described as random. Temporal noise occurs, if a pixel value in a current frame differs substantially from its value in the previous frame, while the values of the adjacent pixels didn't change that much between the two frames. The second type of noise is also known as impulsive noise or speckle noise. It occurs if the value of one pixel in a current frame differs substantially from the values of the adjacent pixels in the same frame. In contrast to temporal noise this second type of noise is defined with respect to a single frame only, that is the definition has no time component.

The compression system cannot decide if high-frequency information is noise and therefore irrelevant for the image content or if it is important for the frame. Thus the compression system processes all high-frequency content. In case that this is caused by noise then it causes degradation of the frame quality because bits are wasted for encoding the noise, which could have been used to contain actual information. So in order to increase the efficiency of the compression system it is desirable to reduce the amount of random noise in the original sequence of frames before compression, so that all bits of the compressed bit stream represent actual information. Furthermore, the noise itself is a visible artifact so it is preferred to remove it.

A simple way used in the prior art to reduce high-frequency content of video sequences is the use of a low-pass filter on an input video sequence. The low-pass filter reduces and even eliminates high frequencies depending on the cut-off property of the filter, which simply cuts off all frequencies that exceed a threshold frequency. However, this filter also cuts off actual high-frequency information and hence produces a 'soft' image.

Another well known way to reduce the high-frequency noise is to use a two-dimensional spatial filter, e.g. a median filter, which preserves some high-frequency image details like borders or edges of objects. However the detection of borders or edges can be affected by noise.

Furthermore there are filters known that take the motion of objects into account. These filters either use motion estimation information or motion detection, both information can be derived from the luminance or chrominance information in the frames of a video sequence.

SUMMARY OF THE INVENTION

One method embodiment of the present invention relates to a method for reducing random noise in digital video pixels, e.g. temporal and salt-and-pepper noise, in a sequence of video frames by processing the digital pixel values of a current and one or more previous frames in the sequence. The method comprises the steps of 1. defining a set of adjacent pixels for each pixel in a currently processed frame,
2. the calculation of a so called activity value for each pixel based on the sum of the squared differences between the pixel values of the current and the previous frame of the adjacent pixels and
3. the calculation of a new value for the currently processed pixel if the determined activity does not exceed a predefined threshold value.

Thus the new pixel value is an alpha blending of the previous temporal pixel and the current pixel as a function of activity.

An apparatus embodiment of the present invention is used for reducing random noise in digital video pixels in frames of a sequence of video frames by processing the values of the digital video pixels in a current and at least one previous frame.

By using the aforementioned techniques, noise in video signals can be reduced with a degree of accuracy previously unavailable.

BRIEF DESCRIPTION OF THE DRAWINGS

The above and other features, aspects and advantages of the present invention will be more fully understood when considered with respect to the following detailed description, appended claims and accompanying drawings, wherein:

DETAILED DESCRIPTION OF THE INVENTION

The invention uses a filter with a spatial and a temporal component to reduce the noise in digital frames. The filter is applied for each processable pixel in a frame, wherein a pixel is meant to be processable, if the secondary conditions are fulfilled as described later on. For each pixel in a current frame a set of adjacent pixels is defined. This can be for example a rectangular block of 3×3 pixels, wherein the center pixel is the currently processed one.

For each pixel in the current frame a so called activity value is calculated in that the current and previous values of the adjacent pixels are processed. Depending from the activity value the value of the center pixel is modified. If the determined activity value is below a predefined threshold value then the pixel value is set to a new value, which is between its original and its previous value, that is the value of the currently processed pixel in the previous frame. Therefore the activity value is a measure for the activity in the values of all adjacent pixels between the current and at the previous frame.

The value of the center pixel itself remains unconsidered when calculating the activity value. Thus the method does not check, if the value of the current pixel differs significantly from the values of the adjacent pixels.

The invention will be more fully understood when considered with respect to the figures.

Figure 1:
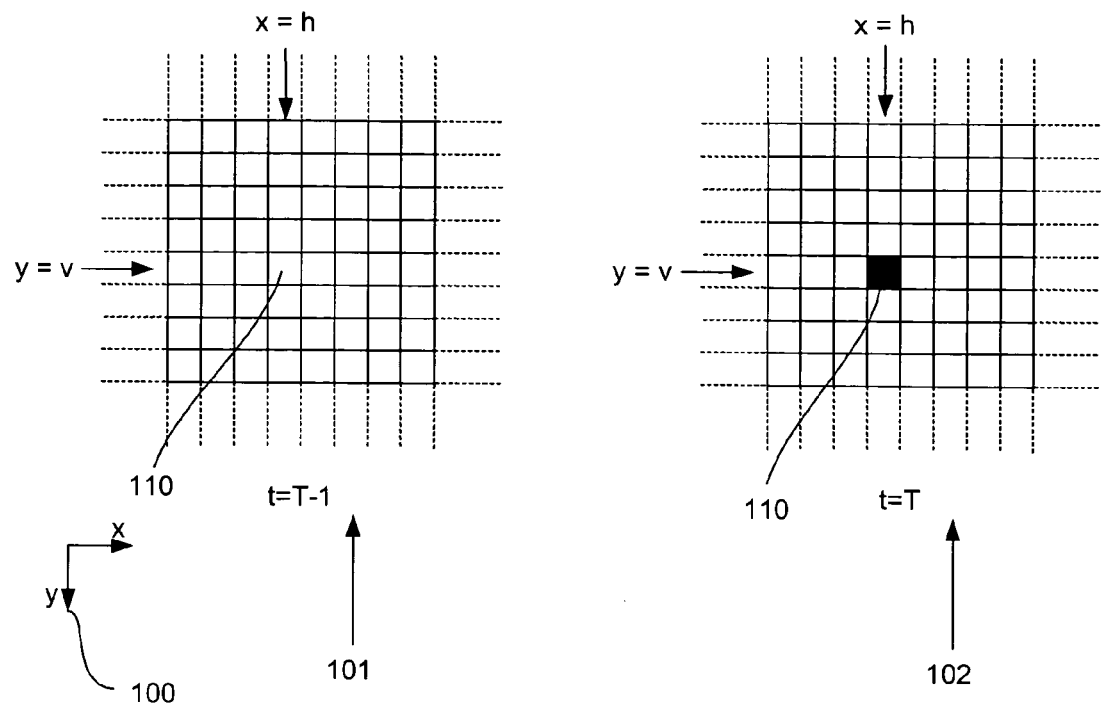
FIG. 1 is a simplified illustration of two frames in a sequence of frames, wherein the value of a pixel in the current frame has changed significantly since the last frame.

FIG. 1 shows an area of pixels in two frames in a sequence of frames, wherein frame 101 is displayed at the time t=T−1 and frame 102 is displayed at the time t=T, so that 101 is just previous to frame 102.

As is commonly known a digital color picture can be described as a matrix of color pixels, wherein each pixel can be described by its luminance value Y and its chrominance values Cr and Cb. Hence a matrix of color pixels can be described by the matrix of luminance values (luma pixels) and the matrices of chrominance values (chroma pixels) Cr and Cb. The matrix in FIG. 1 is assumed to be a matrix of luminance values. However the method can also be applied to pixel values in chrominance matrices.

As is obvious from FIG. 1 the luminance value (Y) of the pixel 110 at the position x=h, y=v has changed significantly between the frames 101 and 102.

It is assumed that this significant change of only one pixel in an area of pixels, which did not change their value is caused by unwanted noise. Such high noise peaks are noise samples of value much higher or much smaller than other samples.

Figure 2:
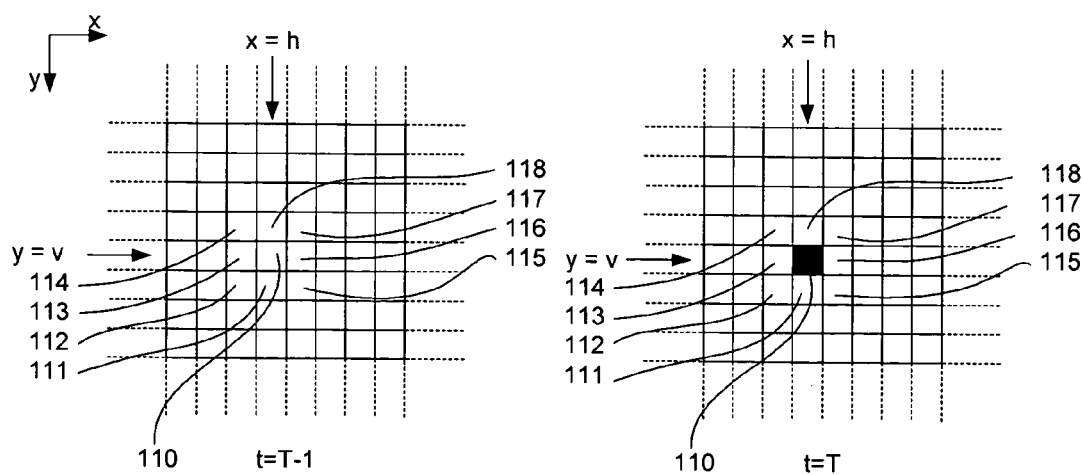
FIG. 2 is a simplified illustration of two frames in a sequence of frames, wherein the pixels are denoted that are used for the filter.

Referring now to FIG. 2 the method for detecting and removing the noise of these pixels consists of two steps, namely the determination of an activity value for a single pixel and, if it has been found that the determined activity value does not exceed a predetermined threshold, the change of the value of that pixel. The method according the present invention does not check if the value of the processed pixel differs from the values of the adjacent pixels.

The pixel 110 is located at the position x=h and y=v. In this example the set of adjacent pixels is defined as a block of 3×3 pixels 111 to 118, wherein 110 is the center pixel.

For each adjacent pixel 111-118 the difference between the values of the pixel in the current frame 102 and the previous frame 101 is calculated. The center pixel 110 remains unconsidered, that is the difference between its current value and its value in the previous frame is not calculated. So if there is a significant difference between the values of the center pixel, then this remains unconsidered.

As the luma values of the pixels are integer values the calculated difference values are also integer. Each of these difference values is then shifted right for a predetermined number of bits. Mathematically each right shift is a division by 2, whereby the type of the value remains unchanged. So if the type of the variable is defined as an integer, then the value might become null in case that the calculated value is so small, that all bits, which have been set to 1, have been shifted out of the value. This right shift of each value causes that only values exceeding a predetermined threshold value do not become null, so that small differences in the values of a pixel between the current and the previous frame, which are caused by temporal or quantizing noise are lost. Thus this right shift of the bits in the variable acts like a filter. The number of bits that the values are shifted right is predetermined and must be determined heuristically by tests.

In the next step the square of the difference value is calculated and added to the activity value of the center pixel, which has been reset to null at the beginning of the processing of the pixel. So regardless if the difference value of the adjacent pixel is positive or negative, a positive value—or null—is added to the activity value. By using square values the higher the difference is the stronger it is weighted, which is known as MSE (Mean Square Error).

Each pixel of the set of adjacent pixels is processed in this way. Thus in this embodiment the activity value for the pixel 110 is the sum of the squares of the 'filtered' difference values of the eight adjacent pixels 111-118.

In the second step the luma value of the center pixel is changed in the case, that the calculated activity value does not exceed a predefined threshold value. To this the activity value is compared with a predefined threshold value. If the activity value is smaller than the threshold value, then the value of the center pixel 110 is set to a new value.

The change of the pixel value takes place in two steps. First a weighting factor (TempRatio) is calculated in that the activity value is divided by the aforementioned activity threshold value, wherein the variable of the weighting factor is an integer type value scaled to N bits. So the weighting factor is directly proportional to the activity value, that is the larger the activity value is, the larger is the weighting factor.

Finally the value of the center pixel 110 is set to a new value, which is calculated corresponding to the following equation $$Y_t = (Y_t \times \text{TempRatio} + Y_{t-1} \times (2^N - \text{TempRatio})) >> N$$

wherein $Y_t$ is the luma value of the center pixel 110 in the current frame $Y_{t-1}$ is the luma value of the center pixel 110 in the previous frame TempRatio is the weighting factor, which is in the interval $0 \ldots 2^N$.

N is the number of bits of the fixed point integer type.

According to this equation the new assigned luma value of the pixel $Y_t$ is closer to the original value in the current frame, if the weighting factor is closer to $2^N$, that is, if the differences of the values of the adjacent pixels 111-118 are big, so that the activity value is high.

Vice versa the new value of the pixel is closer to its value in the previous frame if the calculated activity value is relatively small, that is the differences of the values of the adjacent pixels are small, what indicates that there is not much activity in the adjacent pixels.

So this filter sets the pixel value to a new value only in the case, that the activity of the surrounding pixel values does not exceed a threshold and the value remains unmodified if the values of the surrounding/adjacent pixels change much. The new value of the pixel is between the value of the pixel in the previous frame and the current value and it is weighted as a function of the activity of the adjacent pixels.

High noise peaks can also appear in matrices of chrominance values Cr or Cb, so the filter can be also applied on chrominance values.

The filter method cannot be applied to the first frame of a sequence of frames as it makes use of the current frame and at least one previous frame.

Furthermore the filter method uses the values of adjacent pixels in order to determine the activity value for the center pixel. Thus the use of the filter is restricted to be applied on pixels, which have the adjacent pixels in the x- and y-direction. So in case of the aforementioned example, where a filter of 3×3 pixels is used, the filter cannot be applied to pixels in the first and last row and in the first and last column. Likewise if the filter dimension is $$D=2n+1$$

with n=1,2,3 . . . , then the filter cannot be applied to pixels in the n-th column and n-th row and the last but n-th row and column.

In order to overcome this restriction in the use of the filter different solutions are well known in the state of the art. If a spatial filter of the dimension D=2n+1 with n≧1 shall be applied to pixels at the border of a frame then there must be some pixel values beyond the border of the frame. This can be achieved by either mirroring the necessary count of rows or columns at the border or by wrapping around the rows or columns of the opposite side of the current and previous frame.

Figure 3:
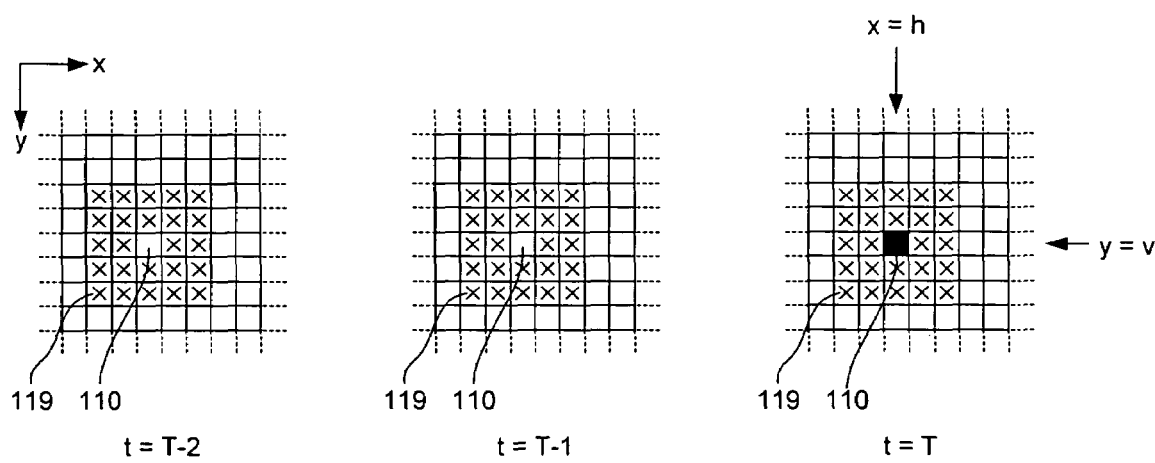
FIG. 3 is a simplified block diagram showing the use of the filter wherein the last two previous frames are used and the filter has a spatial size of 5×5 pixels.

In FIG. 3 another variant of the filter method is shown, which uses the current frame, where the time is t=T, and two previous frames at the times t=T−1 and t=T−2 respectively. The filter method is applied on the pixel 110 in the frame t=T, which has changed its value significantly between the frames t=T−1 and t=T. The spatial position of pixel 110 is x=h on the x-axis and y=v on the y-axis. Generally the spatial size of filter is not limited and can be of any size n. The filter applied in this embodiment has a spatial size of n=5 pixels, so the values of the pixels of the 5×5 pixel block located between x=h−2 to x=h+2 and y=v−2 to y=v+2 are used with the exception of the center pixel at x=h, y=v. The pixel 119, which is located at x=h−2 and y=v+2, is one of these adjacent pixels in the 5×5 pixel block, which is marked with an x. All other pixels, which are marked with an x are members of the set of adjacent pixels and are relevant for calculating the activity value.

In this embodiment of the present invention a first activity value is calculated whereby the differences of the pixel values in the frames at t=T−2 and t=T−1 are used. Then a second activity value is calculated whereby the differences of the pixel values in the frames t=T−1 and t=T are used. The new value of the center pixel is then calculated under consideration of the first and second activity value and respective weighting factors. If the activity values are small, then the pixel values of the pixel block did not change much in the last frames and there is a high probability that in the current frame there is also no significant change. Thus the new pixel value can be closer to its previous values. So if more than one preceding frame is considered for calculating the activity value then these activity values can be evaluated statistically and a more precise activity value can be determined.

Generally the number of previous frames, which are used to calculate the activity value, can vary. The more activity values are calculated from previous frames the higher the probability is that the current pixel also didn't change its value in the current frame. Also the more preceding frames to be processed, the higher the cost of processing becomes. So in a system wherein much processing capacity is available the number of preceding frames can be dynamically adapted according to the available processing capacity.

A variant for calculating the new value of a pixel is to use a combination of the luma activity value and the chroma activity value for calculating the weighting factor TempRatio.

Another variation of the method is to take a calculated motion vector for the pixel into account. So if a motion vector has been calculated for a pixel, then this motion vector can be considered when defining the position of a pixel in a previous frame and a current frame. A common estimated motion can be used as an offset value for the position of a pixel.

Figure 4:
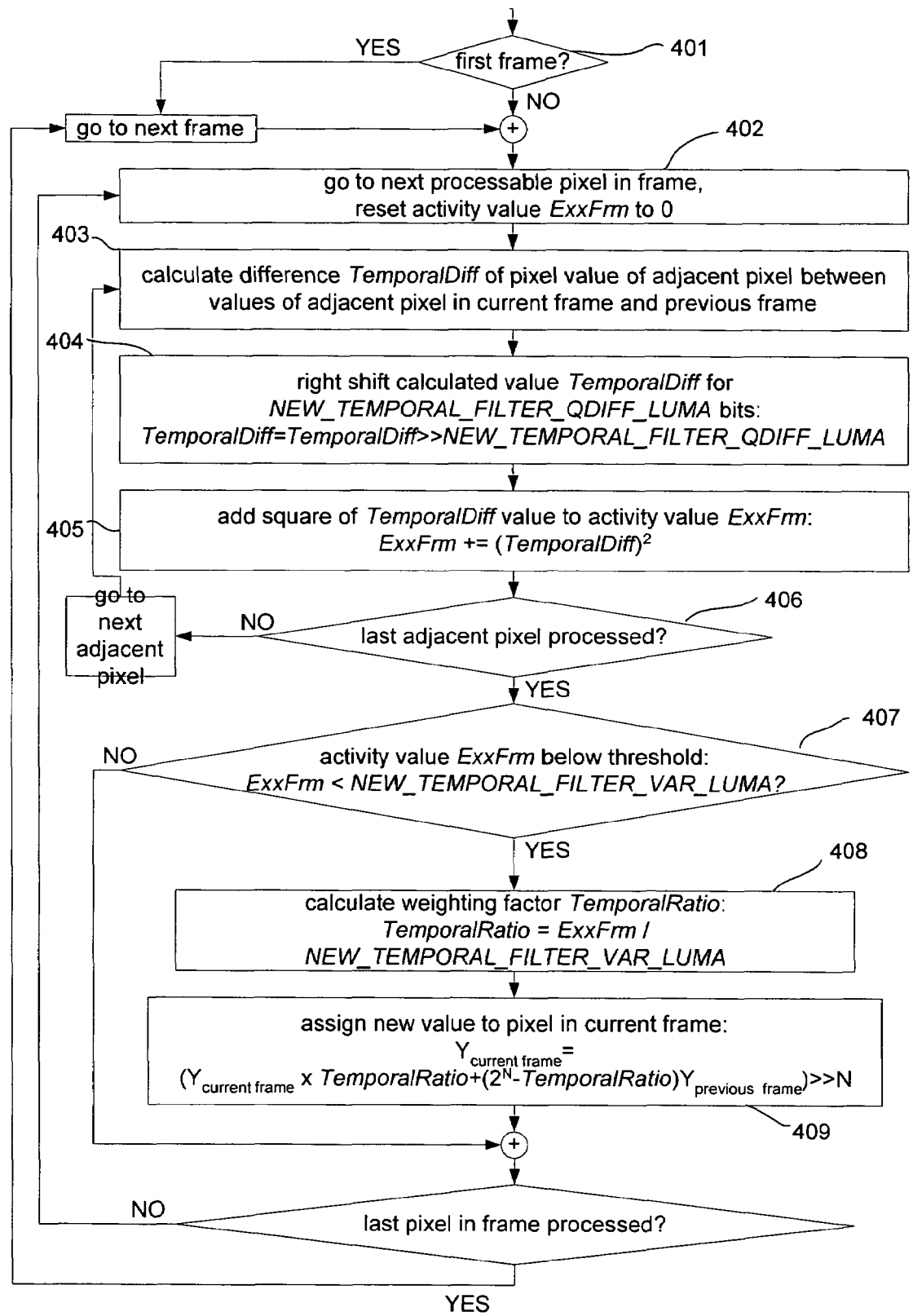
FIG. 4 is a flow diagram showing the processing of the pixel values.

FIG. 4 shows a simplified flow diagram of the filter method according to the present invention. In this example of an embodiment of the invention the processing of a matrix of luminance values is assumed.

The processing begins with the decision block 401 whether the next frame to be processed is the first one. As mentioned before the first frame must be skipped due to the fact that there is no preceding frame, which can be used to calculate the activity value. The method then takes the next processable pixel in 402, in order to apply the filter to it. A pixel is processable by this filter, if there are enough adjacent pixels in the x- and y-direction that can serve to calculate the activity value. Furthermore the variable that holds the activity value ExxFrm is set to 0, so that the activity value is calculated for each processable pixel in the current frame.

The next step 403 is the beginning of a loop, which runs over all adjacent pixels of the pixel to process. As described above these adjacent pixels can be a block of 2n+1 pixels, whereby the center pixel, which is the currently processed pixel is omitted. In this first step 403 the value TemporalDiff of the difference of one adjacent pixel between its value in the current and the previous frame is calculated.

In block 404 the calculated difference value TemporalDiff is shifted right for NEW_TEMPORAL_FILTER$_{13}$ QDIFF_LUMA bits. If the value of TemporalDiff is small, then the value will become null, because all bits, which have been set to 1, are shifted out of the variable. Therefore this right shift acts like a filter, which can only be passed by values being big enough.

The following block 405 adds the square value of each 'filtered' value TemporalDiff to the activity value ExxFrm. This variable holds the activity value for the currently processed pixel In block 406 it is checked if the end of the inner loop, which runs over the adjacent pixels, is reached. If not, then the inner loop processes the next adjacent pixel of the currently processed pixel. Otherwise the loop ends.

In the following block 407 it is checked if the activity value ExxFrm exceeds a predefined threshold value NEW_TEMPORAL_FILTER_VAR_LUMA. If the threshold is exceeded, then the differences between the values in the current frame and the previous frame of the adjacent pixels are so large, that they indicate a certain level of activity in the pixel values. Then the original value of the currently processed pixel remains unmodified and the method runs through the outer loop of the method, that is the next processable pixel will be processed.

In the case that the activity value ExxFrm is below the threshold, then this indicates that between the two frames the values of the adjacent pixels have not changed much and the value of the processed pixel is modified.

In block 408 a weighting factor TemporalRatio is calculated in that the activity value ExxFrm is divided by the predefined value NEW_TEMPORAL_FILTER_VAR_LUMA. The weighting factor is an integer type value scaled to N bits.

This weighting factor is used in block 409 to calculate the new value of the currently processed pixel. The higher the weighting factor is, that is the higher the activity value is, the closer is the new value of the pixel to its original value in the current frame. And vice versa, if the activity value is relatively high and the weighting factor is close to $2^N$, then the new value of the currently processed pixel is closer to the value in the previous frame.

The value of NEW_TEMPORAL_FILTER_VAR_LUMA is a function of profiles. The profiles represent degrees of average motion (no motion, slow motion, high motion) of the scene. These profiles can be calculated using a common motion correlation algorithm.

Another variation of the present invention is to add the absolute value of the difference values to the activity value ExxFrm instead of the square. This also prevents that a negative value of a difference deletes a positive value and the result is null. The threshold values NEW_TEMPORAL_-FILTER_QDIFF_LUMA and NEW_TEMPORAL_FILTER_VAR_LUMA have to be adapted respectively.

What is claimed is:

1. A method to remove noise from digital frames in a sequence of frames comprising:
    defining a set of adjacent pixels for a currently processed pixel;
    calculating an activity value for the currently processed pixel using the set of adjacent pixels, wherein said activity value is calculated on the basis of the sum of the squared difference between a current value of each adjacent pixel and a previous value of each adjacent pixel, each difference being right shifted for a predefined number of bits before squaring; and
    depending on the calculated activity value, either leaving the current value of the currently processed pixel unchanged or, if the activity value is below a predefined threshold value, setting the currently processed pixel to a value calculated on the basis of the activity value, the current and at least one previous value of the currently processed pixel.

2. A method to remove noise from digital frames in a sequence of frames comprising:
    defining a set of adjacent pixels for a currently processed pixel;
    calculating an activity value for the currently processed pixel using the set of adjacent pixels, wherein said activity value is calculated on the basis of the sum of the squared difference between a current value of each adjacent pixel and a previous value of each adjacent pixel;
    determining a weighting factor by dividing the activity value by a predefined activity threshold value;
    calculating the value of the currently processed pixel according to the following equation:

new_pixel value=(weighting_factor×current_pixel_value+(2N−weighting_factor)×previous_pixel_value)>>N wherein
        >> is the right shift operator and
        N is the number of bits of the integer value of the weighting factor; and
    depending on the calculated activity value, either leaving the current value of the currently processed pixel unchanged or, if the activity value is below a predefined threshold value, setting the currently processed pixel to a value calculated on the basis of the activity value, the current and at least one previous value of the currently processed pixel.

3. The method of claim 2 wherein a plurality of activity values for the currently processed pixel is calculated, wherein the activity values are calculated for previous frames and wherein the new value of the currently processed pixel is calculated on the basis of the current and previous values of the pixel and the activity values.

4. The method of claim 3 wherein the number of calculated activity values is dynamically adapted to an available processing capacity.

5. The method of claim 4 wherein the threshold value is dynamically adapted according to a history of calculated activity values.

6. The method of claim 4 wherein the threshold value is dynamically adapted according to a spatial data history of pixel values.

7. The method of claim 1 wherein the pixels of a frame located at an edge of the frame are mirrored at the edge so that there are adjacent pixels for those pixels in the first and last row and column of a frame.

8. An apparatus for removing noise from digital frames in a sequence of frames, comprising:
    a first calculator adapted for calculating an activity value for a currently processed pixel, wherein the activity value is calculated on the basis of the sum of the squared difference between a current value of each adjacent pixel and a previous value of each adjacent pixel, wherein each difference is right shifted for a predefined number of bits;
    a comparator for comparing the activity value to a predefined activity threshold value;
    a second calculator for calculating a weighting factor on the basis of the activity value and said predefined activity threshold value; and
    a third calculator for calculating a pixel value for the currently processed pixel on the basis of the weighting factor, a current pixel value of the currently processed pixel and a previous pixel value of the currently processed pixel.

9. The apparatus of claim 8 further comprising:
    a fourth calculator adapted for calculating a plurality of activity values for a currently processed pixel from a set of adjacent pixels, wherein the activity values are calculated for the current frame and a plurality of previous frames; and
    a fifth calculator for calculating a frame weighting factor for each of the activity values, each frame weighting factor depending on the number of frames between the current frame and the frames used for calculating the respective activity value; and
    a sixth calculator for calculating a pixel value for the currently processed pixel on the basis of at least the current value of the of the currently processed pixel, the pixel values of the currently processed pixel in previous frames and the plurality of calculated activity values.

10. A method to remove noise from digital frames in a sequence of frames comprising:
    defining a set of adjacent pixels for a currently processed pixel;
    determining a plurality of activity values for the currently processed pixel and for at least one previous frame, using the set of adjacent pixels for the frame, wherein each activity value is determined on the basis of the sum of the squared difference between a current value of each adjacent pixel and a previous value of each adjacent pixel, each difference being right shifted for a predefined number of bits before squaring; and depending on the determined activity values, either leaving the current value of the currently processed pixel unchanged or, if one of the determined activity values is below a predefined threshold value, setting the currently processed pixel to a value calculated on the basis of the determined activity values, the current pixel value and at least one previous pixel value, of the currently processed pixel.

11. The method of claim 10 wherein the number of determined activity values is dynamically adapted to the available processing capacity in the system.

12. The method of claim 11 wherein the threshold value is dynamically adapted according to the history of the determined activity values.

13. The method of claim 11 wherein the threshold value is dynamically adapted according to the spatial data history of pixel values.

* * * * *